No. 835,502. PATENTED NOV. 13, 1906.
C. W. A. CORNISH.
AUTOMOBILE TIRE ENVELOP.
APPLICATION FILED NOV. 14, 1905.
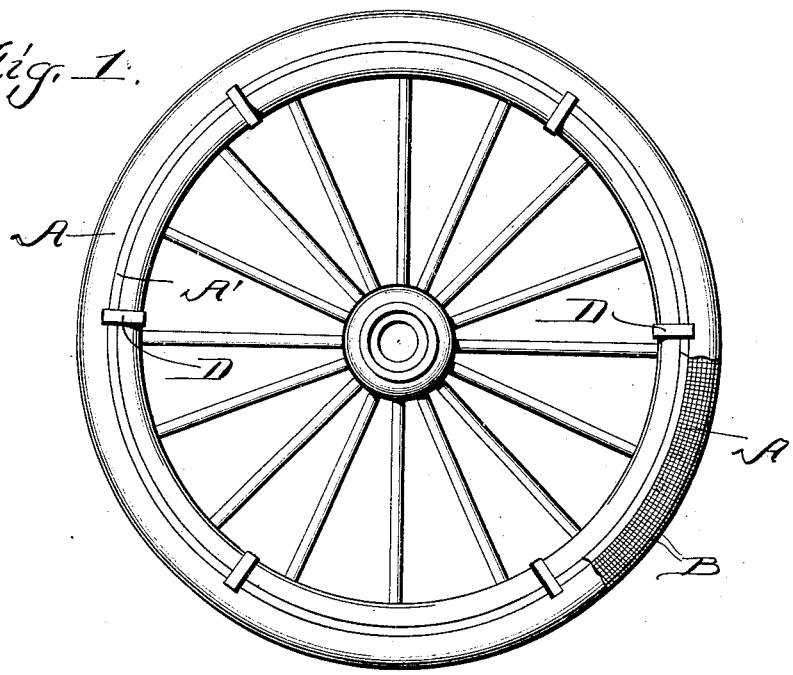
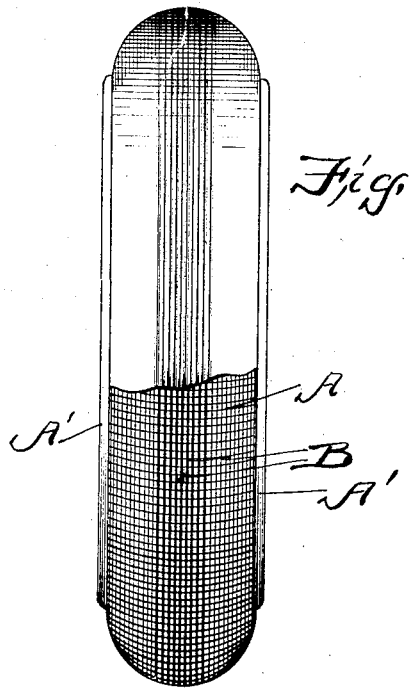
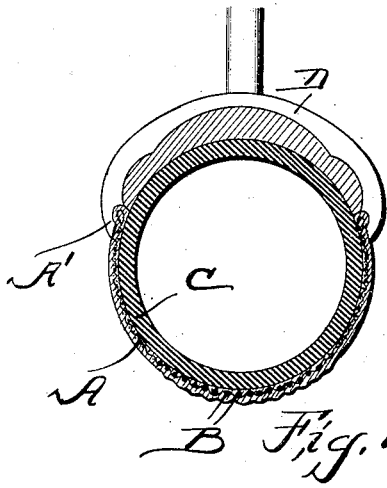
Inventor
CHARLES W. A. CORNISH.

UNITED STATES PATENT OFFICE.

CHARLES W. A. CORNISH, OF PASS CHRISTIAN, MISSISSIPPI, ASSIGNOR OF ONE-HALF TO ROBERT B. MILLER, OF PASS CHRISTIAN, MISSISSIPPI.

AUTOMOBILE-TIRE ENVELOP.

No. 835,502. Specification of Letters Patent. Patented Nov. 13, 1906.

Application filed November 14, 1905. Serial No. 287,284.

*To all whom it may concern:*

Be it known that I, CHARLES W. A. CORNISH, a citizen of the United States, residing at Pass Christian, in the county of Harrison and State of Mississippi, have invented a new and useful Improvement in an Automobile-Tire Envelop, of which the following is a specification.

This invention relates to a steel-wire envelop vulcanized as a preventive against rust, the said steel-wire envelop being designed to incase and cover the tread portion of a pneumatic tire.

The object of the invention is to prolong the lives of a rubber or similar tire by providing it with a metal tread portion, as it will not only save wear of the tire, but will also prevent the puncturing and cutting of the tire.

The invention consists of the novel features of construction hereinafter set forth, pointed out in the claims, and shown in the accompanying drawings, in which—

Figure 1 is a side view of a wheel having my invention applied thereto, a portion of vulcanizing being broken away to show the construction. Fig. 2 is an edge view of a wheel equipped with my tire-protector, the vulcanizing being broken away in the lower portion of the figure. Fig. 3 is a transverse section through a tire and wheel rim and through my envelop, a fastening-clamp being shown in elevation.

This invention consists of a net A, of steel wire, provided along the edges with a selvage A' and having between its two side margins a longitudinal and centrally-arranged tread portion formed of a plurality of heavy parallel wires B, which form the tread portion of the envelop.

The wire network A is placed over a pneumatic tire C, the envelop being formed or shaped on a mandrel, so that it will snugly fit the tread portion and sides of the tire C.

The envelop is held in position by a plurality of metal clamps D, which extend transversely across the felly and which are formed with recesses at the ends to receive and engage the selvage edges A' of the envelop A.

To prevent the metal tire from rusting, it is given a coating of rubber or rubber composition and vulcanized.

In order to place the envelop upon the tire, the latter is deflated and the envelop, which is made slightly smaller than the tire with which it is to be used, is placed in position upon the tire, and the clamps D are also placed in position to straddle the felly and engage the selvage. The tire is then pumped up, and as it becomes inflated it will fit snugly the envelop A, and the clamps D will be locked securely in position.

The advantages of a construction herein described will be obvious to those using pneumatic tires.

Having thus fully described my invention, what I claim as new, and desire to secure by Letters Patent, is—

1. A device of the kind described comprising a wire network adapted to fit a tire, and heavy parallel wires arranged centrally and longitudinally upon said network.

2. A tire-casing comprising a wire network formed with a selvage along opposite sides, and heavy parallel wires carried by said network and arranged parallel to and midway between the selvage.

3. A device of the kind described comprising a steel-wire envelop, a heavy wire tread portion formed of parallel longitudinally-extending wires, and clamps adapted to straddle a felly, the ends of said clamps engaging the sides of the said envelop.

CHAS. W. A. CORNISH.

Witnesses:
 JNO. W. RANDOLPH,
 ROBT. B. MILLER.